(12) United States Patent
Chou et al.

(10) Patent No.: US 11,317,069 B2
(45) Date of Patent: Apr. 26, 2022

(54) IMAGE PROCESSING METHOD BASED ON SENSOR CHARACTERISTICS

(71) Applicant: REALTEK SEMICONDUCTOR CORPORATION, Hsinchu (TW)

(72) Inventors: Yang-Ting Chou, Tainan (TW); Tsung-Hsuan Li, Taichung (TW); Wan-Ju Tang, Hsinchu (TW); Shih-Tse Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/092,361

(22) Filed: Nov. 9, 2020

(65) Prior Publication Data
US 2021/0144351 A1 May 13, 2021

(30) Foreign Application Priority Data
Nov. 11, 2019 (TW) ................ 108140872

(51) Int. Cl.
| | |
|---|---|
| *H04N 5/235* | (2006.01) |
| *H04N 5/262* | (2006.01) |
| *H04N 9/73* | (2006.01) |
| *H04N 9/64* | (2006.01) |

(52) U.S. Cl.
CPC ............ *H04N 9/73* (2013.01); *H04N 5/2353* (2013.01); *H04N 5/2621* (2013.01); *H04N 9/646* (2013.01)

(58) Field of Classification Search
CPC ..... H04N 5/262; H04N 5/2353; H04N 5/2621
See application file for complete search history.

(56) References Cited

U.S. PATENT DOCUMENTS 9,153,036 B2 * 10/2015 Bosco .............. G06T 7/44
10,255,685 B2 * 4/2019 Sharma ............ G06T 7/44

OTHER PUBLICATIONS

Weisheng Dong et al., "Joint Demosaicing and Denoising with Perceptual Optimization on a Generative Adversarial Network", Feb. 13, 2018, pags 1-12, IEEE.
Michael Gharbi et al., "Deep Joint Demosaicking and Denoising", SA '16 Technical Papers,, Dec. 5-8, 2016, Macao.
Keigo Hirakawa et al., "Joint Demosaicing and Denoising", 2005, IEEE.
Image-formation—Apr. 1, 2014—pp. 60-62, Marc Levoy, "image formation", Spring 2014, Stanford University.
Noise + denoising—pp. 73-75, Wojciech Jarosz, "Computational Aspects of Digital Photography", Fall 2015, Dartmouth.
Noise—Apr. 29, 2014—pp. 7-11, Marc Levoy, "Noise and ISO", Spring 2014, Stanford University.

* cited by examiner

*Primary Examiner* — Ahmed A Berhan
(74) *Attorney, Agent, or Firm* — WPAT, PC

(57) ABSTRACT

Disclosed is an image processing method based on sensor characteristics. The method includes the following steps: obtaining a constant of a relation "$c \approx \sigma(x)/\sqrt{x}$" between output signals "x" and the noise standard deviation "$\sigma(x)$" of the output signals, in which the output signals are outputted by a sensor based on a sensor gain such as an ISO value of a camera; and calculating an output value of a target pixel according to pixel values within a sampling window, the constant, and a front-end gain such as an auto exposure gain, in which the pixel values include an input value of the target pixel.

8 Claims, 8 Drawing Sheets

IMAGE PROCESSING METHOD BASED ON SENSOR CHARACTERISTICS

BACKGROUND OF THE INVENTION

1. Field of the Invention

The present invention relates to an image processing method, especially to an image processing method based on sensor characteristics.

2. Description of Related Art

A general alpha blending technique uses a noise level to determine the degree of a texture/smooth characteristic of each pixel in a picture, and assigns a blending ratio to each pixel according to the degree of the texture/smooth characteristic of this pixel for the execution of subsequent processes. In regard to a conventional image processing device, many modules thereof have demands for noise reduction and texture retention; however, one or more back-end modules among these modules usually lack the information of an unspoiled noise level for determining the degree of a texture/smooth characteristic of each pixel due to one or more front-end processes (e.g., auto white balance, auto exposure gain, lens shading correction (LSC), and black level correction (BLC)), and thus the back-end modules are often incapable of distinguishing a texture region of a picture from a smooth region of the picture.

Several conventional techniques are listed below for reference:
(1) Weisheng Dong, Ming Yuan, Xin Li, and Guangming Shi, "Joint Demosaicing and Denoising with Perceptual Optimization on a Generative Adversarial Network".
(2) Micha″el Gharbi, Gaurav Chaurasia, Sylvain Paris, and Fr′edo Durand "Deep Joint Demosaicking and Denoising".
(3) Keigo Hirakawa and Thomas W. Parks, "JOINT DEMOSAICING AND DENOISING".
(4) Marc Levoy, "Image formation", page 60~62, Computer Science Department, Stanford University, CS 178, Spring 2014.
(5) Wojciech Jarosz, "Computational Aspects of Digital Photography—Noise & Denoising", Dartmouth College, CS 89.15/189.5, Fall 2015.
(6) Marc Levoy, "Noise and ISO", page 7~11, Computer Science Department, Stanford University, CS 178, Spring 2014.

SUMMARY OF THE INVENTION

An object of the present disclosure is to provide an image processing method based on sensor characteristics without the problem of the prior art.

An embodiment of the image processing method of the present disclosure includes the following steps: obtaining a constant "$c \approx \sigma(x)/\sqrt{x}$" of a relation between output signals and a noise standard deviation "$\sigma(x)$" of these output signals, in which the output signals are outputted by a sensor based on at least one sensor gain (e.g., photosensitivity such as an ISO value of a camera); calculating a gradient value according to values of pixels within a sampling range, in which the values of pixels include an input value of a target pixel; calculating a smooth value and a texture value according to the values of pixels; obtaining a weighting value based on a weighting calculation according to a weighting variation rate, the gradient value, a front-end gain (e.g., an auto exposure gain), and the constant; and obtaining an output value of the target pixel based on a blending calculation based on at least the smooth value, the texture value, and the weighting value.

Another embodiment of the image processing method of the present disclosure includes the following steps: obtaining a constant of a relation between output signals and a noise standard deviation of these output signals, in which the output signals are outputted by a sensor based on at least one sensor gain; calculating an output value of a target pixel according to values of pixels within a sampling range, the constant, and a front-end gain, wherein an input value of the target pixel is one of the values of pixels.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
FIG. 1 shows a sensor's output image.
Figure 2:
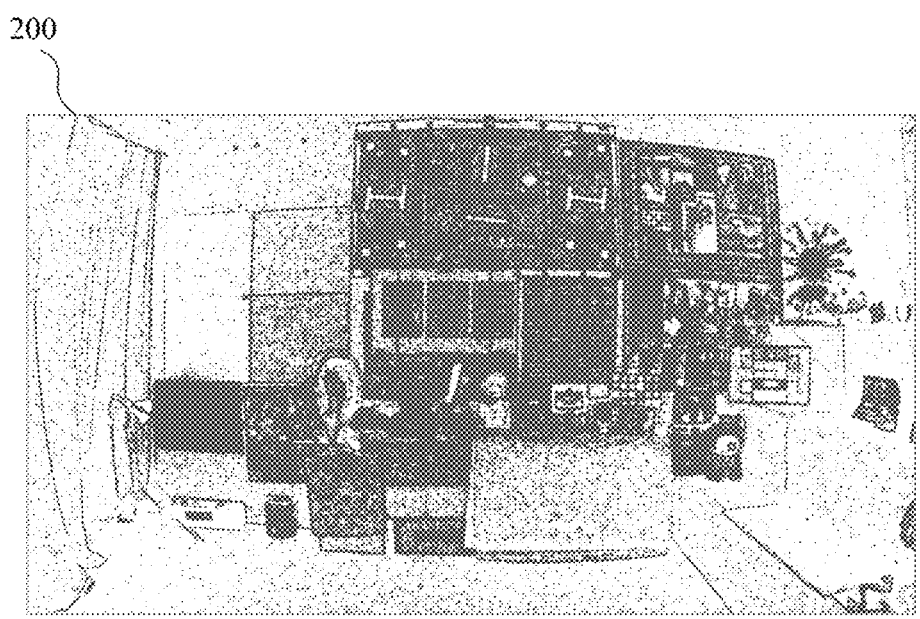
FIG. 2 shows the texture of FIG. 1 obtained according to a low texture-recognition threshold.
Figure 3:
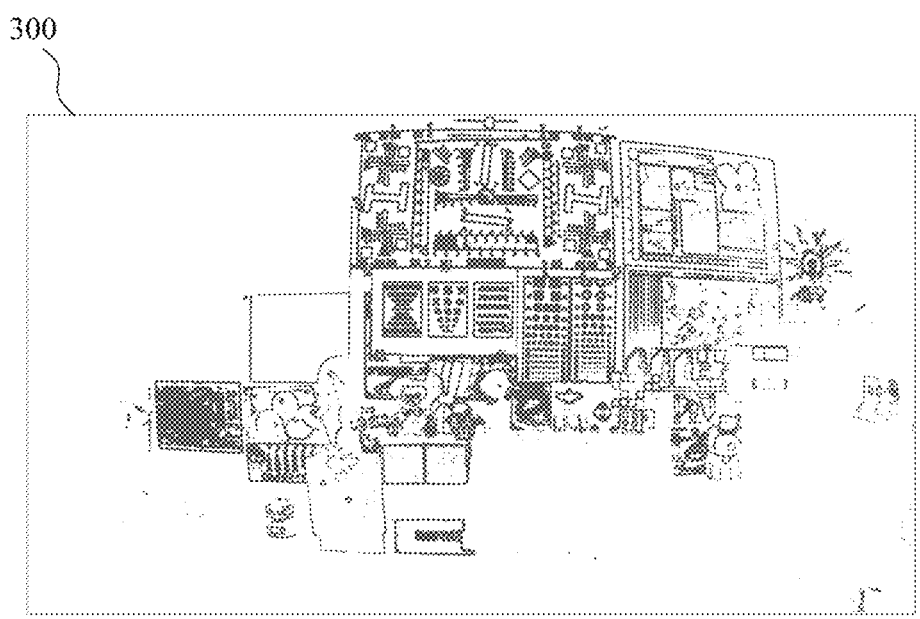
FIG. 3 shows the texture of FIG. 1 obtained according to a high texture-recognition threshold.
Figure 4:
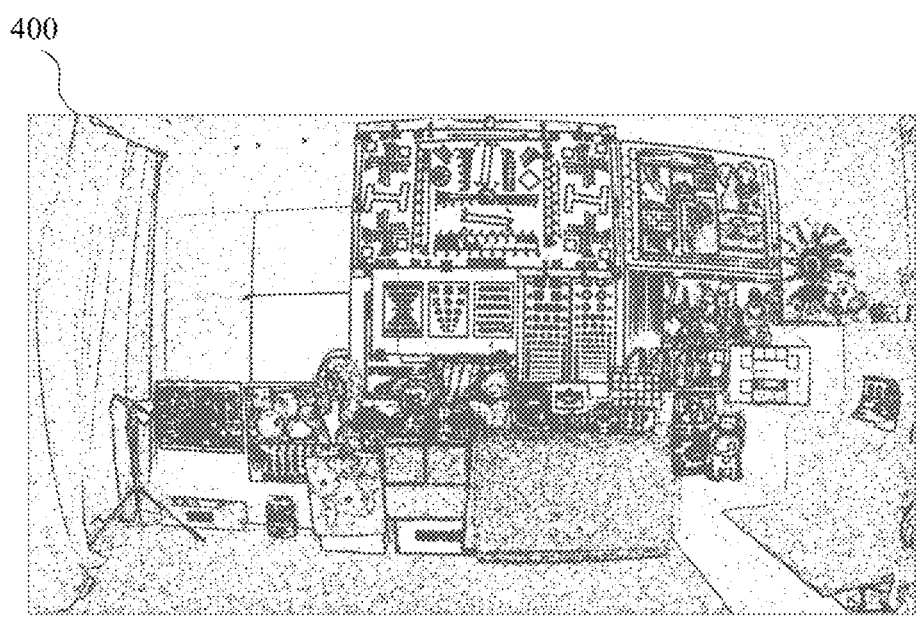
FIG. 4 shows the texture of FIG. 1 obtained according to an embodiment of the present disclosure.

A feature of the present invention is capable of accurately determining the degree of a texture/smooth characteristic of each pixel in a picture according to the characteristics of a sensor (e.g., an optical sensor). A general prior art (e.g., a prior art functioning based on gradient value calculation) is hard to distinguish the texture region in a picture from the smooth region in the picture because the noise strength of a dark part of the picture may be different from the noise strength of a bright part of the picture. Take a sensor's output image 100 of FIG. 1 for example; if a fixed threshold is used for distinguishing the texture region in the image 100 from the smooth region in the image 100 regardless of the noise difference between the dart part and bright part of the image 100, some of the smooth region in the image 100 will be mistaken for a texture region as shown in the image 200 of FIG. 2 on condition that the fixed threshold is relatively low, or some of the texture region in the image 100 will be mistaken for a smooth region as shown in the image 300 of FIG. 3 on condition that the fixed threshold is relatively high. Compared with the above-mentioned prior art, the present invention can accurately distinguish the texture region in the image 100 from the smooth region in the image 100 as shown in the image 400 of FIG. 4. It should be noted that the black part in the images of FIGS. 2-4 is indicative of a texture region while the white part in these images is indicative of a smooth region.

Figure 5:
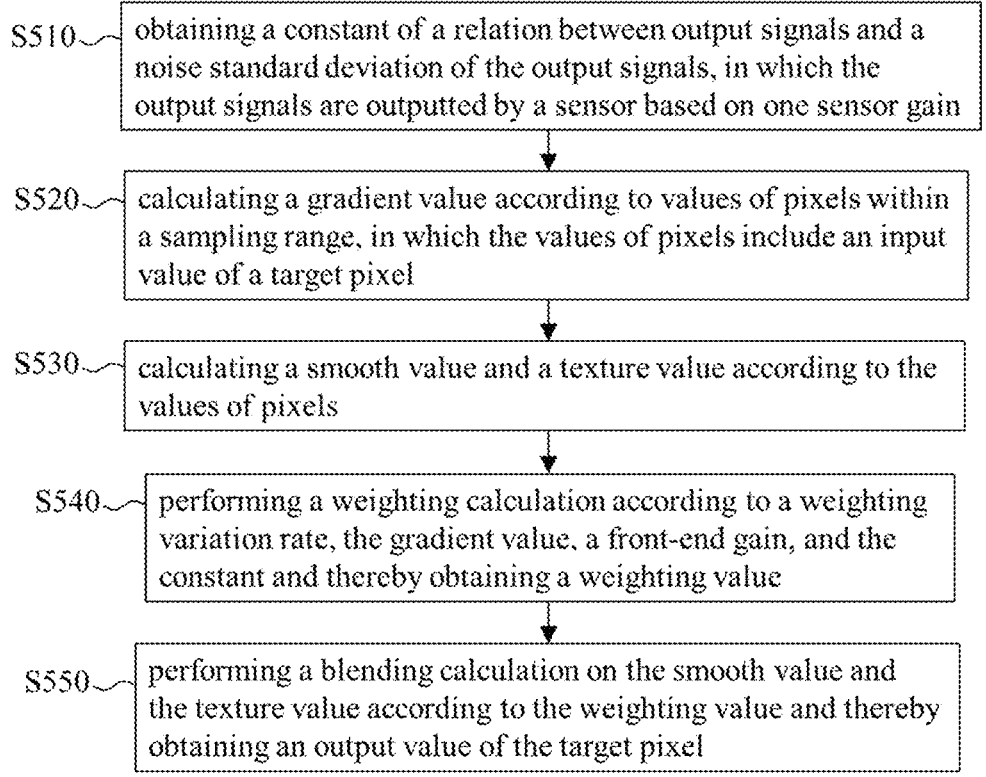
FIG. 5 shows the image processing method based on sensor characteristics according to an embodiment of the present disclosure.

FIG. 5 shows the image processing method based on sensor characteristics according to an embodiment of the present disclosure. This image processing method can be performed by a known or self-developed image processing device, and includes the following steps:

step S510: obtaining a constant "$c \approx \sigma(x)/\sqrt{x}$" of a relation between output signals "x" and a noise standard deviation "$\sigma(x)$" of these output signals, in which the output signals are outputted by a sensor based on at least one sensor gain (e.g., photosensitivity such as an ISO value of a camera).

Figure 6:
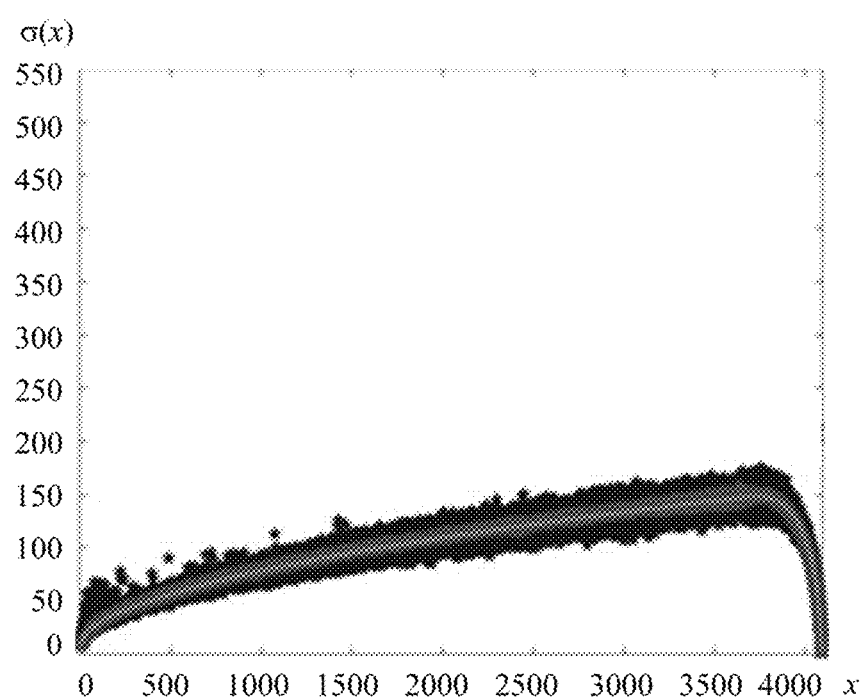
FIG. 6 shows the relation between the grayscale values of output signals of a sensor and noise standard deviations of these output signals.

In an exemplary implementation, the sensor gain is 16, each of the pixel values of the output signals is a 12-bit value (i.e., a value between 0 and 4095), the main noise of the sensor is shot noise, and the sensor captures K images (e.g., 100 images) of the same object according to each of Q kinds of exposure time (e.g., 1/30 second, 1 second, and 10 seconds) so that the total captured images amount to Q×K images and they basically cover all kinds of pixel values (i.e., every value between 0 and 4095), wherein each of the Q and the K is an integer greater than one. On the basis of the above, one average pixel value can be obtained according to the average of the pixel values of the K images related to the same pixel position, and thereby Q average pixel values related to the same pixel position can be obtained according to the Q×K images and the total average pixel values related to all/selected pixel positions of all the captured images can cover all kinds of pixel values (i.e., every value between 0 and 4095), wherein each set of K images among the Q×K images relates to the same exposure time and the Q×K images relates to the Q kinds of exposure time. Afterwards, a standard deviation can be obtained according to K pixel values of a set of K images related to one pixel position and the average pixel value related to this pixel position of the same set of K images, more standard deviations can be obtained in the same way, and then a regression line can be obtained according to the distribution of all the standard deviations "$\sigma(x)$" in relation to all the average pixel values "x" as shown in FIG. 6. In light of the above, the relation between the square root $\sqrt{x}$ of each average pixel value (a.k.a. each grayscale value) and the standard deviation $\sigma(x)$ corresponding to this average pixel value can be expressed with the equation $\sigma(x) \approx c \times \sqrt{x}$, in which "c" is a constant that can be derived from the regression line of FIG. 6. As a result, the relation between the square root $\sqrt{x}$ (i.e., $\sqrt{0}, \sqrt{1}, \ldots$, and $\sqrt{n}$, in which "n" is the maximum grayscale value) and its corresponding standard deviation $\sigma(x)$ (i.e., $\sigma_0, \sigma_1, \ldots$, and $\sigma_n$) can be expressed with the following equation:

$$\begin{bmatrix} \sqrt{0} \\ \sqrt{1} \\ \vdots \\ \sqrt{n} \end{bmatrix} c = \begin{bmatrix} \sqrt{\sigma_0} \\ \sqrt{\sigma_1} \\ \vdots \\ \sqrt{\sigma_n} \end{bmatrix}$$

step S520: calculating a gradient value according to values of pixels within a sampling range, in which the values of pixels include an input value of a target pixel.

In an exemplary implementation, the pixels within the sampling range forms a 3×3 pixel matrix $$\begin{bmatrix} 4 & 4 & 0 \\ 4 & 4 & 0 \\ 4 & 4 & 0 \end{bmatrix};$$

the central pixel in this pixel matrix is the target pixel; a square root matrix $$\begin{bmatrix} 2 & 2 & 0 \\ 2 & 2 & 0 \\ 2 & 2 & 0 \end{bmatrix}$$

can be obtained by calculating a square root of each pixel value of the pixel matrix; a horizontal gradient value "$G_H=2$" and a vertical gradient value "$G_V=0$" can be obtained by multiplying the square root matrix by a predetermined horizontal gradient mask $$\begin{bmatrix} 0 & 0 & 0 \\ 1 & 0 & -1 \\ 0 & 0 & 0 \end{bmatrix}$$

and a predetermined vertical gradient mask $$\begin{bmatrix} 0 & 1 & 0 \\ 0 & 0 & 0 \\ 0 & -1 & 0 \end{bmatrix}$$

respectively; and then the gradient value "$G_{TOTAL}=G_H+G_V=2$" can be obtained according to the horizontal and vertical gradient values.

step S530: calculating a smooth value and a texture value according to the values of pixels.

In an exemplary implementation, the pixels within the sampling range forms a 3×3 pixel matrix $$\begin{bmatrix} 4 & 4 & 0 \\ 4 & 4 & 0 \\ 4 & 4 & 0 \end{bmatrix};$$

the smooth value $$"I_{Smooth} = \frac{24}{9}"$$

is equal to the sum (i.e., 24) of all the pixel values divided by the total number of pixels (i.e., 9); the texture value $$"I_{Texture} = \frac{12}{3}"$$

is equal to the sum (i.e., 4+4+4=12) of those pixels including the target pixel along the texture direction (i.e., the vertical direction because $G_H > H_V$ in this exemplary implementation) divided by the total number of those pixels (i.e., 3).

step S540: performing a weighting calculation according to a weighting variation rate (e.g., the slope determined by the thresholds thd0 and thd1 mentioned below), the gradient value, a front-end gain (e.g., an auto exposure gain), and the constant and thereby obtaining a weighting value (a.k.a. a blending ratio) "W".

Figure 7:
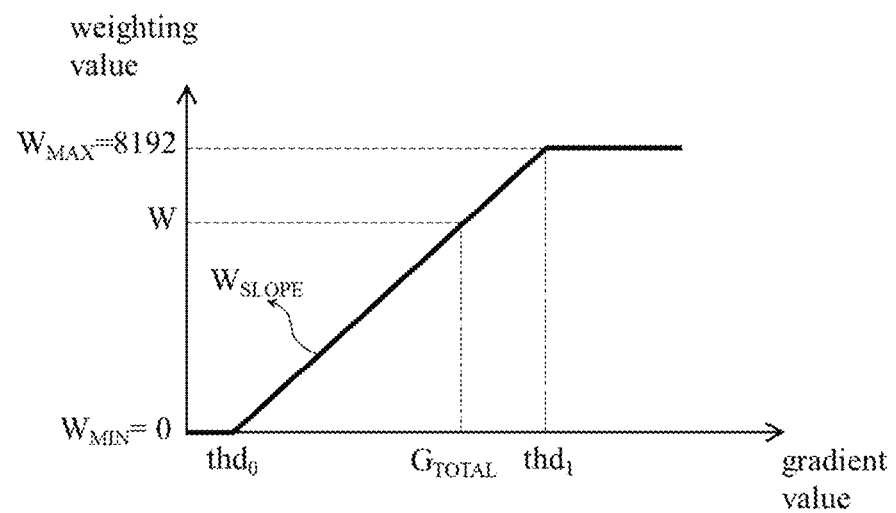
FIG. 7 shows the relation between a gradient value and a weighting value.

In an exemplary implementation, the front-end gain "DG" is 4, the constant "c" is 0.75, the smooth region threshold setting value "thd$_{0\_manual}$" and the texture region threshold setting value "thd$_{1\_manual}$", that are set by a user or predetermined, are 0.4 and 4 respectively; therefore the smooth region threshold $$\text{"}thd_0 = thd_{0\_manual} \times \frac{\sqrt{DG} \times c}{2} = 0.4 \times \frac{\sqrt{4} \times 0.75}{2} = 0.3\text{"}$$

can be obtained according to the smooth region threshold setting value, the front-end gain, and the constant, and the texture region threshold $$\text{"}thd_1 = thd_{1\_manual} \times \frac{\sqrt{DG} \times c}{2} = 4 \times \frac{\sqrt{4} \times 0.75}{2} = 3\text{"}$$

can be obtained according to the texture region threshold setting value, the front-end gain, and the constant. In addition, the smooth region threshold and the texture region threshold jointly determine the weighting variation rate "$W_{SLOPE}$" as shown in FIG. 7 (i.e., the slope of a straight line between the minimum weighting value $W_{MIN}$ assigned to thd$_0$ and the maximum weighting value $W_{MAX}$ assigned to thd$_1$, that is to say $$\text{"}W_{SLOPE} = \frac{W_{MAX} - W_{MIN}}{thd_1 - thd_0} = \frac{8192 - 0}{3 - 0.3} \approx 3034\text{"}).$$

Accordingly, the weighting value "W" being equal to "the difference between the gradient value and the smooth region threshold" multiplied by "the weighting variation rate" is obtained (i.e., W=(G$_{TOTAL}$−thd$_0$)×W$_{SLOPE}$+W$_{MIN}$=(2−0.3)× 3034+0≈5158). It should be noted that any gradient value less than the smooth region threshold is assigned the minimum weighting value (e.g., the minimum weighting value "0" as shown in FIG. 7), and any gradient value greater than the texture region threshold is assigned the maximum weighting value (e.g., the maximum weighting value "8192" as shown in FIG. 7) in this exemplary implementation.

step S550: performing a blending calculation on the smooth value and the texture value according to the weighting value and thereby obtaining an output value of the target pixel.

In an exemplary implementation, step S550 includes the following steps: multiplying the texture value "$I_{Texture}$" by the weighting value "W" to obtain a weighting texture value; multiplying the smooth value "$I_{Smooth}$" by a difference between a maximum weighting value and the weighting value "W" to obtain a weighting smooth value; summing the weighting texture value and the weighting smooth value up to obtain a sum value; and dividing the sum value by the maximum weighting value to obtain the output value "$I_{OUTPUT}$". This exemplary implementation can be expressed with the following equation:

$$I_{OUTPUT} = \frac{W \times I_{Texture} + (W_{MAX} - W) \times I_{Smooth}}{8192}$$

If the values obtained in the exemplary implementations of the previous steps substitute for the variables of the above equation, the output value "$I_{OUTPUT}$" of the target pixel is shown below:

$$I_{OUTPUT} = \frac{5158 \times \frac{12}{3} + (8192 - 5158) \times \frac{24}{9}}{8192} \approx 3.5$$

It should be noted that in the exemplary implementation of step S540, the way to calculate the smooth region threshold and the texture region threshold is based on the following conditions. The front-end gain "DG" and the noise standard deviation "σ(x)≈c×√x" of the output signals of the sensor have been obtained already; T(•) denotes a conversion equation for performing conversion on the output signals of the sensor; therefore, a gradient value for determining a texture/smooth characteristic can be calculated with the following gradient equation: T(DG×x+DG×σ(x))− T(DG×x)≈T'(DG×x)·DG×σ(x). Furthermore, given $$T(x) = \sqrt{x}, T'(x) = \frac{1}{2\sqrt{x}}$$

can be derived, and thus the gradient equation can be rewritten as shown below:

$$T'(DG \times x) \cdot DG \times \sigma(x) = \frac{1}{2\sqrt{DG \times x}} \times DG \times (\sqrt{x} \times c) = \frac{\sqrt{DG} \times c}{2}.$$

In brief, both the gradient value and the front-end gain "DG" are related to the constant "c".

In an exemplary implementation, the sensor is an optical sensor. In an exemplary implementation, the front-end gain is or relates to one of the following: a lens shading correction (LSC) gain; a gain for pixel values of a specific color; an auto exposure (AE) gain; a black level correction (BLC) gain; and a color correction matrix (CCM). In an exemplary implementation, the main noise of the output signals is shot noise. In an exemplary implementation, the output signals include all signals between a signal having a minimum grayscale value and a signal having a maximum grayscale value.

Figure 8:
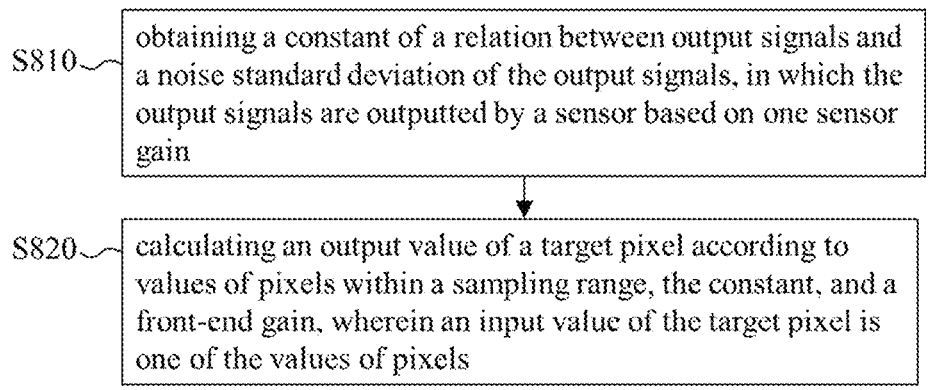
FIG. 8 shows the image processing method based on sensor characteristics according to another embodiment of the present disclosure.

FIG. 8 shows an image processing method based on sensor characteristics according to another embodiment of the present disclosure. This image processing method includes the following steps:

step S810: obtaining a constant of a relation between output signals and a noise standard deviation of these output signals, in which the output signals are outputted by a sensor based on at least one sensor gain.

step S820: calculating an output value of a target pixel according to values of pixels within a sampling range, the constant, and a front-end gain, wherein an input value of the target pixel is one of the values of pixels.

Since those of ordinary skill in the art can refer to the disclosure of FIGS. 1-7 to appreciate the detail and modification of the embodiment of FIG. 8, which implies that some or all of the features of the disclosure of FIGS. 1-7 can be applied to the embodiment of FIG. 8 in a logical way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, one can implement the present invention flexibly in accordance with the present disclosure.

To sum up, the image processing method of the present disclosure can accurately determine the degree of a texture/smooth characteristic of each pixel in an image based on sensor characteristics.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method, comprising:
    obtaining a constant of a relation between output signals and a noise standard deviation of the output signals, the output signals being outputted by a sensor based on at least one sensor gain;
    calculating a gradient value according to values of pixels within a sampling range, wherein the values of pixels include an input value of a target pixel and the step of calculating the gradient value includes:
        processing the values of pixels with a horizontal gradient mask to obtain a horizontal gradient value;
        processing the values of pixels with a vertical gradient mask to obtain a vertical gradient value; and
        summing up the horizontal gradient value and the vertical gradient value to obtain the gradient value;
    calculating a smooth value and a texture value according to the values of pixels;
    obtaining a weighting value based on a weighting calculation according to a weighting variation rate, the gradient value, a front-end gain, and the constant, wherein the step of obtaining the weighting value based on the weighting calculation includes:
        calculating a product of a smooth region threshold setting value, the front-end gain, and the constant to obtain a smooth region threshold;
        calculating a product of a texture region threshold setting value, the front-end gain, and the constant to obtain a texture region threshold; and
        on condition that the gradient value is less than the smooth region threshold, using a minimum weighting value as the weighting value; on condition that the gradient value is greater than the texture region threshold, using a maximum weighting value as the weighting value; and on condition that the gradient value is between the smooth region threshold and the texture region threshold, using a product of a slope and a difference between the gradient value and the smooth region threshold as the weighting value, in which the slope is determined by the smooth region threshold and the texture region threshold; and
    obtaining an output value of the target pixel based on a blending calculation based on at least the smooth value, the texture value, and the weighting value, wherein the step of obtaining the output value of the target pixel based on the blending calculation includes:
        multiplying the texture value by the weighting value to obtain a weighting texture value;
        multiplying the smooth value by a difference between a maximum weighting value and the weighting value to obtain a weighting smooth value;
        summing the weighting texture value and the weighting smooth value up to obtain a sum value; and
        dividing the sum value by the maximum weighting value to obtain the output value.

2. The method of claim 1, wherein the relation is indicative of a relation between a standard deviation of each noise of the output signals and a square root of each of the output signals.

3. The method of claim 1, wherein the constant is indicative of an approximate value that is a standard deviation of any noise of the output signals divided by a square root of any of the output signals.

4. The method of claim 1, wherein the sensor is an optical sensor.

5. The method of claim 1, wherein the front-end gain relates to one of a lens shading correction (LSC) gain, a gain for pixel values of a specific color, an auto exposure (AE) gain, a black level correction (BLC) gain, and a color correction matrix (CCM) gain.

6. The method of claim 1, wherein main noise of the output signals is shot noise.

7. The method of claim 1, wherein the output signals include a plurality of signals related to Q kinds of exposure time, the plurality of signals includes K signals related to an identical exposure time, and each of the Q and the K is an integer greater than one.

8. The method of claim 1, wherein the output signals include all signals between a signal having a minimum grayscale value and a signal having a maximum grayscale value.

* * * * *